US011483035B2

(12) United States Patent
Song et al.

(10) Patent No.: US 11,483,035 B2
(45) Date of Patent: Oct. 25, 2022

(54) METHOD AND DEVICE FOR PERFORMING PRECODING

(71) Applicant: Nokia Shanghai Bell Co., Ltd., Shanghai (CN)

(72) Inventors: Nuan Song, Shanghai (CN); Huan Sun, Shanghai (CN); Tao Yang, Shanghai (CN)

(73) Assignee: Nokia Shanghai Bell Co., Ltd., Shanghai (CN)

( * ) Notice: Subject to any disclaimer, the term of this patent is extended or adjusted under 35 U.S.C. 154(b) by 156 days.

(21) Appl. No.: 16/766,040

(22) PCT Filed: Nov. 23, 2018

(86) PCT No.: PCT/CN2018/117093
§ 371 (c)(1),
(2) Date: May 21, 2020

(87) PCT Pub. No.: WO2019/101152
PCT Pub. Date: May 31, 2019

(65) Prior Publication Data
US 2020/0304177 A1   Sep. 24, 2020

(30) Foreign Application Priority Data
Nov. 24, 2017   (CN) .......................... 201711193932.2

(51) Int. Cl.
*H04W 4/00* (2018.01)
*H04B 7/0417* (2017.01)
(Continued)

(52) U.S. Cl.
CPC ......... *H04B 7/0417* (2013.01); *H04B 7/0456* (2013.01); *H04B 7/0617* (2013.01); *H04B 7/0626* (2013.01); *H04L 5/0051* (2013.01)

(58) Field of Classification Search
CPC .. H04B 7/0417; H04B 7/0456; H04B 7/0617; H04B 7/0626; H04L 5/0051
(Continued)

(56) References Cited

U.S. PATENT DOCUMENTS

2009/0322613 A1   12/2009   Bala et al.
2010/0295730 A1   11/2010   Jeon
(Continued)

FOREIGN PATENT DOCUMENTS

CN   101442351 A   5/2009
CN   104112911 A   10/2014
(Continued)

OTHER PUBLICATIONS

International Search Report PCT/ISA/210 for International Application No. PCT/CN2018/117093 dated Mar. 4, 2019.
(Continued)

*Primary Examiner* — Zewdu A Kassa
(74) *Attorney, Agent, or Firm* — Harness, Dickey & Pierce, P.L.C.

(57) ABSTRACT

Disclosed are methods and apparatuses for performing precoding. A method disclosed comprises steps of: transmitting a CSI reference signal to a UE to request the UE to report status-related information of respective panels; acquiring, based on first feedback information from the UE, the status-related information of the respective panels whose status-related information has been measured by the UE and a serving panel selected by the UE; and performing, based on the status-related information of the respective panels and the serving panel selected by the UE, two-stage beamforming separately to the respective panels, so as to first perform decoupling to suppress inter-panel interference and then perform per-panel precoding. The disclosure offers the following advantages: effectively eliminating the inter-panel
(Continued)

and intra-panel interference, avoiding complex inter-panel calibration, and reducing implementation complexity and CSI feedback overhead.

14 Claims, 7 Drawing Sheets

(51) Int. Cl.
 *H04B 7/0456* (2017.01)
 *H04B 7/06* (2006.01)
 *H04L 5/00* (2006.01)
(58) Field of Classification Search
 USPC .................................. 375/329, 320, 316, 219
 See application file for complete search history.

(56) References Cited

U.S. PATENT DOCUMENTS

| | | | | |
|---|---|---|---|---|
| 2016/0157218 A1* | 6/2016 | Nam | ................... | H04B 7/0639 370/329 |
| 2018/0091272 A1* | 3/2018 | Wang | ................... | H04B 7/0626 |

FOREIGN PATENT DOCUMENTS

| | | |
|---|---|---|
| CN | 106160807 A | 11/2016 |
| CN | 106793108 A | 5/2017 |
| CN | 106899338 A | 6/2017 |
| CN | 106961401 A | 7/2017 |
| CN | 106992805 A | 7/2017 |
| CN | 107113045 A | 8/2017 |
| CN | 107294887 A | 10/2017 |
| WO | WO-2016062178 A1 | 4/2016 |
| WO | WO-2017014572 A1 | 1/2017 |
| WO | WO-2017039510 A1 | 3/2017 |

OTHER PUBLICATIONS

Office Action for corresponding Chinese Application No. 201711193932.2 dated Sep. 28, 2020.
Office Action for corresponding Chinese Application No. 20171119392.2 dated Jan. 12, 2021.
Search Report for European Application No. 18881303.4 dated Jul. 2, 2021.
Reexamination Decision dated Mar. 30, 2022 in Chinese Application No. 201711193932.2.

* cited by examiner

METHOD AND DEVICE FOR PERFORMING PRECODING

CROSS-REFERENCE TO RELATED APPLICATIONS

This application is a national phase under 35 U.S.C. § 371 of PCT International Application No. PCT/CN2018/117093 which has an International filing date of Nov. 11, 2018, which claims priority to Chinese Application No. 201711193932.2, filed Nov. 24, 2017, the entire contents of each of which are hereby incorporated by reference.

FIELD

Embodiments of the present disclosure generally relate to the field of communications, and more particularly relate to methods and apparatuses for performing precoding.

BACKGROUND

In the prior art, massive MIMO (Multi-Input Multi-Output) systems which employ arrays with a considerable number of antenna elements have a great potential to obtain a large multiplexing gain and accordingly deliver a high throughput. The two-stage precoding technique and hybrid analog-digital beamforming technique are able to significantly alleviate the efforts on implementation and hardware, However, conventional technologies cannot accommodate a MU (Multi-User) MIMO system well, which mainly have the following problems:

1) in order to reduce the implementation complexity for MU massive MIMO, the Joint Spatial Division and Multiplexing (JSDM) two-stage beamforming technique has been proposed, which utilizes Block Diagonalization (BD) for decoupling, so that per-group processing (either linear precoding or non-linear precoding) can be carried out. However, this technique is developed based on the whole array, which is too complicated to be applied for massive MIMO systems;

2) existing decentralized precoding solutions are not designed for large array systems or panel-based array architectures but rather for traditional MIMO systems. Accordingly, the corresponding implementation procedure and the UE's behavior will be different.

3) In existing solutions, the UE-transparent CSI acquisition is mostly considered, where the UE is able to receive multiple CSI-RSs (Channel Status Information Reference Signals) and feedback multiple CSI to assist the precoding design for data transmissions. In such a method, the UE has no idea on its channel status from different panels and the feedback is usually with respect to the whole array, which imposes a large overhead of CSI feedback due to the massive number of antennas of the array in the system.

SUMMARY

An objective of the present disclosure is to provide methods for performing precoding and apparatuses for the same.

According to an aspect of the present disclosure, there is provided a method for performing precoding in a base station, wherein the antenna array of the base station is divided into a plurality of panels, each panel corresponding to a plurality of ports to serve multiple users, the method comprising steps of:

A. transmitting a channel status information CSI reference signal to a UE to request the UE to report status-related information of respective panels;

B. acquiring, based on first feedback information from the UE, the status-related information of the respective panels measured by the UE and a serving panel selected by the UE;

C. performing, based on the status-related information of the respective panels and the serving panel selected by the UE, two-stage beamforming separately to the respective panels, so as to first perform decoupling to suppress inter-panel interference and then perform per-panel precoding.

According to an aspect of the present disclosure, there is provided a method for assisting in performing precoding in a UE, comprising steps of:

measuring status-related information of one or more panels upon receiving a CSI reference signal transmitted from a base station;

selecting, by performing a channel status estimation operation, one panel as a serving panel from the respective panels whose status-related information has been measured;

generating corresponding first feedback information, wherein the first feedback information includes the indicator of the selected panel and the status-related information of the respective panels; and feeding back the first feedback information to the base station.

According to an aspect of the present disclosure, there is provided a precoding apparatus for performing precoding in a base station, wherein the antenna array of the base station is divided into a plurality of panels, each panel corresponding to a plurality of ports to serve multiple users, the precoding apparatus comprising:

a transmitting module configured for transmitting a channel status information CSI reference signal to a UE to request the UE to report status-related information of respective panels;

an acquiring module configured for acquiring, based on first feedback information from the UE, the status-related information of the respective panels measured by the UE and a serving panel selected by the UE;

a performing module configured for performing, based on the status-related information of the respective panels and the serving panel selected by the UE, two-stage beamforming separately to the respective panels, so as to first perform decoupling to suppress inter-panel interference and then perform per-panel precoding According to an aspect of the present disclosure, there is provided an assisting apparatus for assisting in performing precoding in a UE, comprising:

a measuring module configured for measuring status-related information of one or more panels upon receiving a channel status information CSI reference signal transmitted from a base station;

a selecting module configured for selecting, by performing a channel status estimation operation, one panel as a serving panel from the respective panels whose status-related information has been measured;

a generating module configured for generating corresponding first feedback information, wherein the first feedback information includes the indicator of the selected panel and the status-related information of the respective panels; and a feedback module configured for feeding back the first feedback information to the base station.

Compared with the prior art, the present disclosure offers the following advantages: through interaction between the base station and the UE, status information of respective panels measured by the UE is obtained; through the two-stage beamforming performed by the base station to the respective panels, intra- and inter-panel interference can be effectively suppressed; moreover, the solution of the present disclosure implements per-panel two-stage beamforming, wherein the first-stage decoupling only requires the channels between some non-serving UEs and the current panel, which eliminates complex inter-panel calibration and reduces implementation complexity and CSI feedback overhead; moreover, the base station may transmit an aperiodic CSI reporting request so as to update the status-related information of a specific panel for execution of further signal processing, thereby enhancing system performance.

BRIEF DESCRIPTION OF THE DRAWINGS

Other features, objectives, and advantages of the present disclosure will become more apparent through reading the detailed description of the non-limiting embodiments with reference to the drawings below.

In the drawings, like or similar reference numerals represent like or similar components.

DETAILED DESCRIPTION OF EMBODIMENTS

Figure 1:
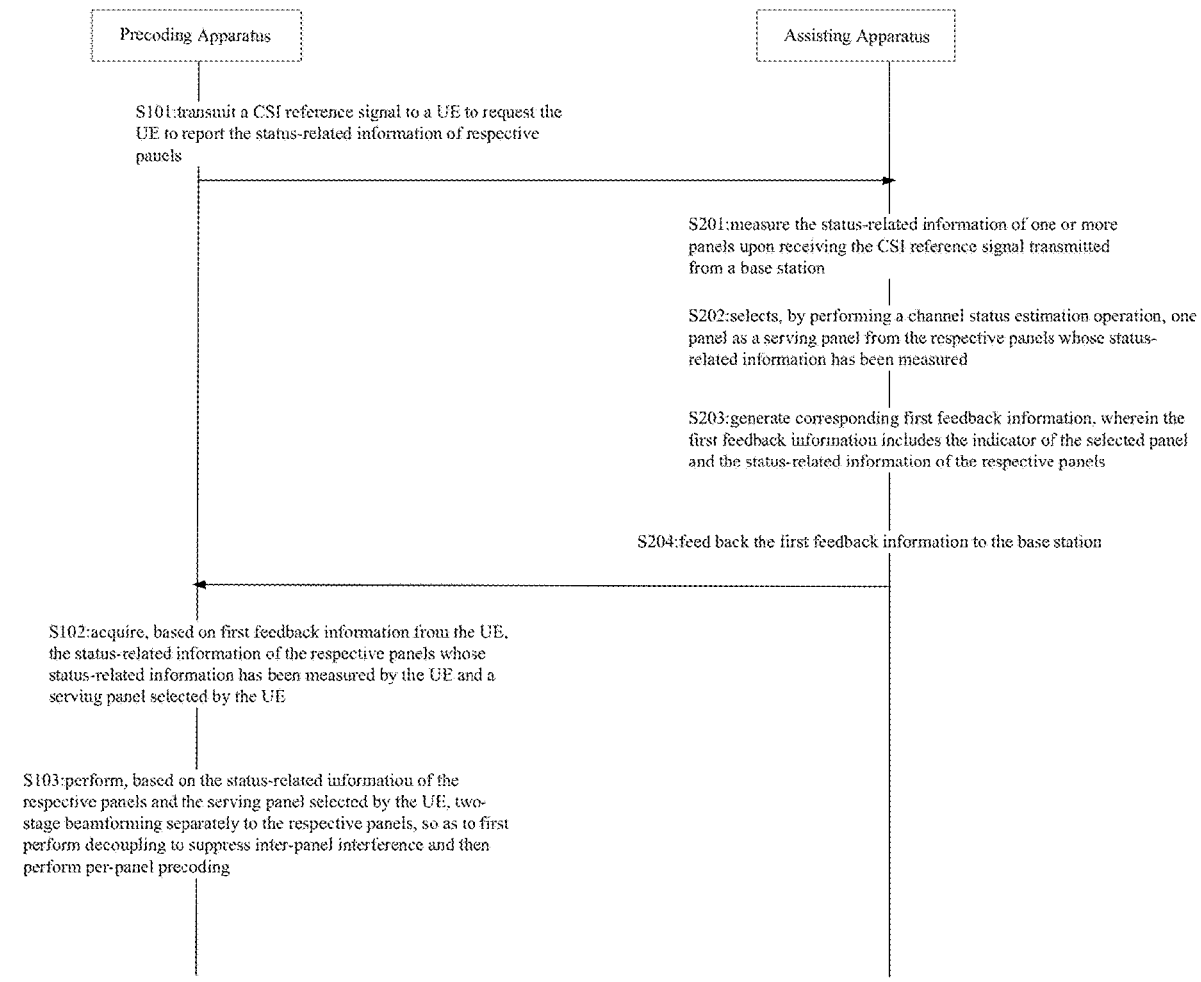
FIG. 1 is a flow diagram of a method for performing precoding according to the present disclosure.

Hereinafter, the present disclosure will be described in further detail with reference to the accompanying drawings:

FIG. 1 is a flow diagram of a method for performing precoding according to the present disclosure. The method according to the present disclosure comprises Step S101, Step S102, and Step S103, which are performed at a base station, and Step S201, Step S202, Step S203, and Step S204, which are performed at UE (User Equipment).

Particularly, the method according to the present disclosure is implemented by a precoding apparatus included in the base station and an assisting apparatus included in the UE.

Particularly, the base station includes, but not limited to, a macro base station, a micro base station, and a femtocell, etc.

Preferably, the base station and the UE are both included in a MIMO system.

Particularly an antenna array of the base station is divided into a plurality of panels, each panel corresponding to a plurality of ports to serve multiple users.

Preferably, the base station dynamically divides the antenna array of the base station into a plurality of groups based on locations of respective UEs.

Hereinafter, illustration will be made with reference to FIG. 3, which is a schematic diagram of exemplary panels of a base station according to the present disclosure.

Figure 3:
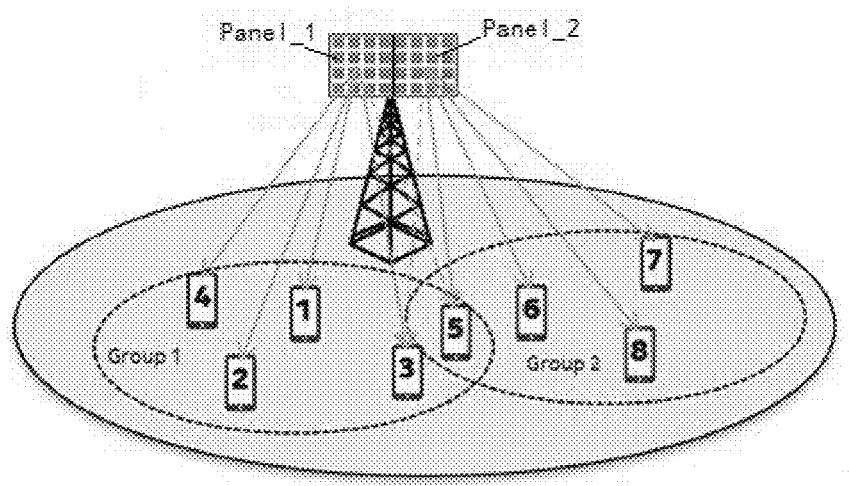
FIG. 3 is a schematic diagram of panels of an exemplary base station according to the present disclosure.

According to a first example of the present disclosure, referring to FIG. 3, the base station divides the antenna array into two groups: Group 1 and Group 2, corresponding to Panel_1 and Panel_2, respectively; the base station currently serves 8 UEs (represented by 1 to 8), wherein Panel_1 serves UE1 to UE4 via 4 ports, and Panel_2 serves UE5 to UE8 via 4 ports.

Figure 4:
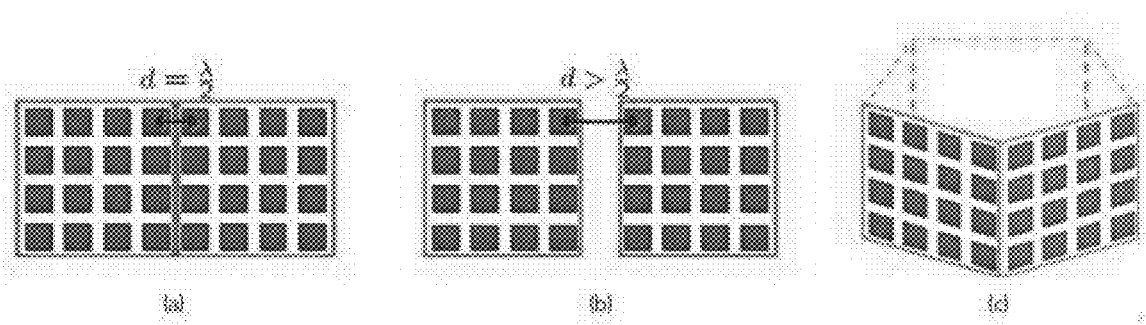
FIG. 4 is a structural schematic diagram of three exemplary panels according to the present disclosure.

FIG. 4 is a structural schematic diagram of three exemplary panels according to the present disclosure.

Referring to FIG. 4, the multiple panels may be distributed in a uniform, non-uniform, or conformal manner, as indicated in (a) to (c), respectively. In the uniform multi-panel array, the inter-panel distance is the same as the inter-element distance, i.e., $$d = \frac{\lambda}{2};$$

while for the non-uniform panel, $$d > \frac{\lambda}{2}.$$

But for both uniform and non-uniform, the whole array is still planar, while for the conformal array, multiple panels build up a non-planar array. Particularly, FIG. 4(c) shows panels with two facets thereof forming a pentagonal prism.

Figure 5:
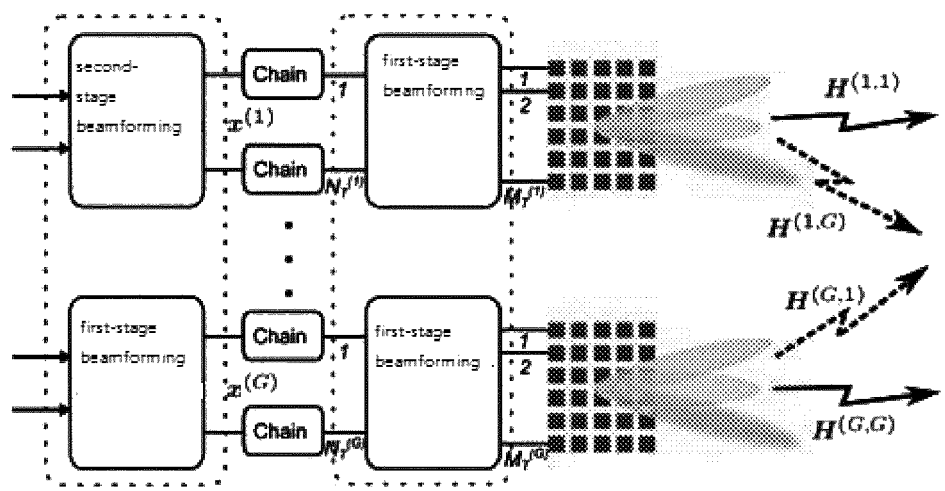
FIG. 5 is a schematic diagram of an exemplary two-stage beamforming procedure in a downlink MU MIMO system according to the present disclosure.

Particularly, the precoding apparatus performs two-stage beamforming. Hereinafter, the two-stage beamforming procedure will be illustrated with reference to FIG. 5, which shows a schematic diagram of an exemplary two-stage beamforming procedure in a downlink MU MIMO system according to the present disclosure Referring to FIG. 5, the base station has $M_T$ antennas, forming G panels, where $M_T = \sum_{g=1}^{G} M_T^{(g)}$, $M_T^{(g)}$ denotes the number of antennas of the $g^{th}$ panel. Assume that K UEs are divided in G groups, and the $g^{th}$ panel serves respective UEs from the $g^{th}$ group.

The $k^{th}$ user is mounted with $M_R$ antennas and the total number of receive antennas is $M_R = \sum_{K=1}^{K} M_{R_k} = \sum_{g=1}^{G} M_R^{(g)}$, where $M_R^{(g)}$ is the total number of receive antennas of respective UEs of the $g^{th}$ group. The two-stage beamforming procedure comprises two stages, i.e., first-stage beamforming and second-stage beamforming, wherein the first-stage beamforming acts as a rank reduction and inter-panel interference suppression, mapping data streams from $N_T = \sum_{g=1}^{G} N_T^{(g)}$ effective chains to $M^T$ antennas ($N_T < M_T$).

The second-stage beamforming processes $R = \sum_{K=1}^{K} r_k = \sum_{g=1}^{G} r^{(g)}$ data streams onto effective chains.

To enhance throughput performance of both the system and UEs, per-panel beamforming can also be performed by a non-linear precoder. As shown in FIG. 4, the output vector of the second-stage beamformer is denoted by with the symbol vector of data streams $x=[x_1^T, \ldots, x_K^T]^T = [x^{(1)T}, \ldots, x^{(G)T}]^T \in \mathbb{C}^{N_T}$ being $s=[s_1^T, \ldots, s_K^T]^T = [s^{(1)T}, \ldots, s^{(G)T}]^T \in \mathbb{C}^r$. The total received signal vector is given by:

$$r = HF_D x + n \in \mathbb{C}^{M_R} \quad (1)$$

where the whole decoupling matrix $F_D = \text{blkdiag}\{F_D^{(1)}, \ldots, F_D^{(G)}\} \in \mathbb{C}^{M_T \times N_T}$ is a block diagonal matrix; and n is the Additive White Gaussian Noise (AWGN) with variance $\sigma_n^2$. The channel matrix $H \in \mathbb{C}^{M_R \times M_T}$ can be written as:

$$H = [H_1^T, H_2^T, \ldots, H_K^T]^T = \qquad (2)$$

$$[H^{(1)}, H^{(2)}, \ldots, H^{(G)}] = \begin{bmatrix} H^{(1,1)} & H^{(2,1)} & \ldots & H^{(G,1)} \\ H^{(1,2)} & H^{(2,2)} & \ldots & H^{(G,2)} \\ \vdots & \vdots & \ddots & \vdots \\ H^{(1,G)} & H^{(2,G)} & \ldots & H^{(G,G)} \end{bmatrix}$$

where $H_k \in \mathbb{C}^{M_{Rk} \times M_T}$ corresponds to the channel from the whole BS array to the $k^{th}$ user and $H^{(g)} \in \mathbb{C}^{M_R \times M_T^{(g)}}$ is the channel from the $g^{th}$ panel to all UEs served by the $g^{th}$ panel. The channel matrix $H^{(g,i)} \in \mathbb{C}^{M_R^{(i)} \times M_T^{(g)}}$ denotes the channel from the e panel to all users served by the $i^{th}$ panel. For the case i≠j, the corresponding $H^{(g,i)}$ indicates the leakage channel from the $g^{th}$ Panel to the $i^{th}$ Panel.

Preferably, the base station applies specific indicators to identify respective panels; and the method configures, in the UE, the indicators corresponding to respective panels in step S104 (not shown) performed by the base station and in step S205 (not shown) performed by the UE before the steps shown in FIG. 1.

In step S104, the precoding apparatus transmits CSI configuration information to the UE so as to configure, in the UE, the indicators corresponding to respective panels.

Next, in step S205, the assisting apparatus receives the CSI configuration information from the base station to configure, in the UE, the indicators corresponding to respective panels.

Preferably, the base station uses specific indicators CRgIs to identify different panels, and uses conventional CSI information to indicate status information of the panels. For example, for the scenario in FIG. 3, Panel_1 is indicated by CRgI 1, and Panel_2 is indicated by CRgI 2.

Preferably, the precoding apparatus dynamically configures the port of each panel serving the UE by transmitting specific CSI configuration information to the UE.

For example, when there are an unequal number of UEs to be served by two panels of the base station, the precoding apparatus assigns an unequal number of ports to each of the two panels by transmitting specific CSI configuration information to the UE.

Preferably, the precoding apparatus performs the above configuration procedure in higher layer signaling such as RRC or MAC signaling.

Hereinafter, the illustration will be made with reference to FIG. 1. In step S101, the precoding apparatus transmits a channel status information CSI reference signal to a UE to request the UE to report the status-related information of respective panels;

In step S201, the assisting apparatus measures the status-related information of one or more panels upon receiving the CSI reference signal transmitted from a base station.

Particularly, the status-related information includes various kinds of channel status-related information.

Preferably, the status-related information refers to CSI information, including PMI (precoding matrix indicator), RI (rank indication), and CQI (channel quality indicator), etc.

In step S202, the assisting apparatus selects, by performing a channel status estimation operation, one panel as a serving panel from the respective panels whose status-related information has been measured;

Specifically, the assisting apparatus selects the panel with currently the best channel status as the serving panel by performing a channel status estimation operation.

In step S203, the assisting apparatus generates corresponding first feedback information.

Particularly, the first feedback information includes the indicator of the selected panel and the status-related information of the respective panels.

Particularly, the first feedback information refers to the feedback information with respect to the CSI reference signal from the base station.

Preferably, the assisting apparatus feeds back, in the first feedback information, the status-related information corresponding to multiple panels.

Preferably, the first feedback information includes the indicator of the serving panel selected by each UE and the status-related information of other potential panels.

Continued with the first example, each UE measures the CSIs from itself to Panel_1 and Panel_2 based on CSI-RS1 and CSI-RS2, respectively, where $H_1^{(1,1)}$ exclusively indicates the channel matrix of the serving Panel_1 measured by UE1 based on CSI-RSI, and $H_1^{(2,1)}$ exclusively denotes the channel matrix of its non-serving Panel_2 measured by UE1 based on CSI-RS2. The CQI does not consider the interfering channel from non-serving panels, since it is assumed that the coordinated beamforming nulls out the leakage channel. The CQI calculated by UE 1 can be simply written by $$CQI_1 = \frac{\|H_1^{(1,1)} F_{D,1}^{(1)}\|^2}{\sigma_{1+N}^2} \qquad (3)$$

where $F_{D,3}^{(1)}$ is the decoupling matrix applied for UE 1 in Panel 1.

The UE1 reports, in the first feedback information, $H_1^{(1,1)}$ and $H_1^{(2,1)}$ in their pre-allocated places to the base station.

With continued reference to FIG. 1, next, in step S204, the assisting apparatus feeds back the first feedback information to the base station.

Preferably, the first feedback information can be multiplexed in time or frequency, depending on different PUCCH (Physical Uplink Control Channel) formats.

Hereinafter, the form of the first feedback information will be illustrated with reference to FIG. 6, which shows a schematic diagram of an exemplary subframe structure of first feedback information according to the present disclosure.

Figure 6:
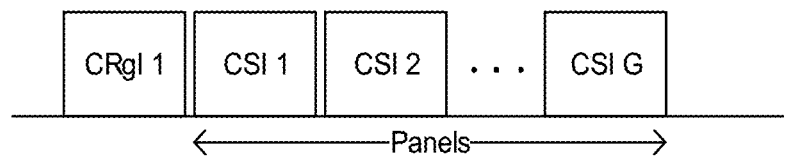
FIG. 6 is a schematic diagram of an exemplary subframe structure of first feedback information according to the present disclosure.

Referring to FIG. 6, CRGI 1 at the initial position indicates the serving panel selected by the UE, and subsequent CSI 1 to CSI G indicate the respective CSI information in the G panels measured by the UE.

With continued reference to FIG. 1, in step S102, the precoding apparatus acquires, based on the first feedback information from the UE, the status-related information of the respective panels measured by the UE and a serving panel selected by the UE;

Next, in step S103, the precoding apparatus performs, based on the status-related information of the respective panels and the serving panel selected by the UE, two-stage beamforming separately to the respective panels, so as to first perform decoupling to suppress inter-panel interference and then perform per-panel precoding.

Specifically, the step S103 comprises step S1031 (not shown) and step S1032 (not shown).

In step S1031, the precoding apparatus calculates, based on the channels from the UE to the respective panels, decoupling matrices and beamforming matrices corresponding to the respective panels.

In step S1032, the precoding apparatus performs precoding to the respective panels.

Preferably, the decoupling matrices and beamforming matrices corresponding to the respective panels are calculated using the SLNR (Signal-to-Leakage-plus-Noise Ratio) algorithm.

For example, an intuitive way is to find the decoupling matrix $F_D^{(g)} \in \mathbb{C}^{M_T^{(g)} \times N_T^{(g)}}$ for the $g^{th}$ panel such that:

$$H^{(g,i)} F_D^{(g)} = 0, \text{ for } i \neq g. \quad (4)$$

The SLNR maximization problem for the $g^{th}$ panel can be formulated by $$\max_{F_D^{(g)}} SLNR^{(g)} = \frac{P_T^{(g)} \|H^{(g,g)} F_D^{(g)}\|_F^2}{\sum_{i=1, i \neq g}^{G} P_T^{(g)} \|H^{(g,i)} F_D^{(g)}\|_F^2 + \sigma_n^2 M_R^{(g)}} \quad (5)$$

$$= \frac{tr\{F_D^{(g)H} R_g F_D^{(g)}\}}{tr\{F_D^{(g)H} \tilde{R}_g F_D^{(g)}\}},$$

where $P_T^{(g)}$ is the total transmit power for the $g^{th}$ panel, and the covariance matrices of the desired channel and the leakage channel are $R_g = H^{(g,g)H} H^{(g,g)}$, and $\tilde{R}_g = \tilde{H}^{(g,g)H} \tilde{H}^{(g,g)} + \sigma_n^2 M_R^{(g)} / P_T^{(g)} I_{M_T^{(g)}}$, respectively.

$\tilde{H}^{(g,g)} = [H^{(g,1)T}, \ldots, H^{(g,g-1)T}, H^{(g,g+1)T}, \ldots, H^{(g,G)T}]^T$ is the channel excluding the desired panel. The maximization SLNR problem can be reduced to maximizing a lower bound, which maximizes the smallest generalized Rayleigh quotient as $$\max_{F_D^{(g)H} F_D^{(g)} = I_{r(g)}} \min_{i=1,\ldots,r(g)} = \frac{f_D^{(i)} R_g f_D^{(i)}}{f_D^{(i)H} \tilde{R}_g f_D^{(i)}}. \quad (6)$$

The decoupling matrix can then be obtained by dominant $N_T^{(g)}$ eigenvectors corresponding to $N_T^{(g)}$ largest eigenvalues of $\tilde{R}_g^{-1} R_g$.

It is noted that for higher frequencies such as Millimeter Wave (mmWave), due to hardware constraints, the first-stage beamforming is usually carried out by cost-effective analog phase shifters. Thus, analog beamforming may be implemented by further baseband decoupling. Similarly, the analog beamforming requires the CSI information from all considered UEs measured at themselves and is obtained by calculating the eigenvalue decomposition of the channel covariance matrix $R_g$ at the $g^{th}$ panel, i.e. obtaining the ordered eigenvectors) of $R_g$ corresponding to $N_T^{(g)}$ largest eigenvalues $U_g(:,1:N_T^{(g)})$. then, the analog beamforming is obtained by taking phases of the eigenvectors:

$$F_{RF}^{(g)} = e^{j \text{ angle}(U_g(:,1:N_T^{(g)}))}. \quad (7)$$

Then, the above SLNR based decoupling can be applied on the intermediate equivalent channel $\overline{H} = HF_{RF} \in \mathbb{C}^{M_R \times N_T}$.

Afterwards, the second-stage precoding carried out at each panel can be either linear or non-linear precoding.

It is noted that those skilled in the art should appreciate that the decoupling matrices and beamforming matrices corresponding to the respective panels may be calculated with various SLNR algorithms, not limited to the SLNR algorithm stated above, and those skilled in the art may select an appropriate algorithm based on actual needs to calculate the decoupling matrices and beamforming matrices corresponding to the respective panels.

According to a preferred embodiment of the present disclosure, the base station transmits an aperiodic CSI reporting request to the UE to request for updating the status-related information of a specific panel for further performance of signal processing, which enhances system performance.

Figure 7:
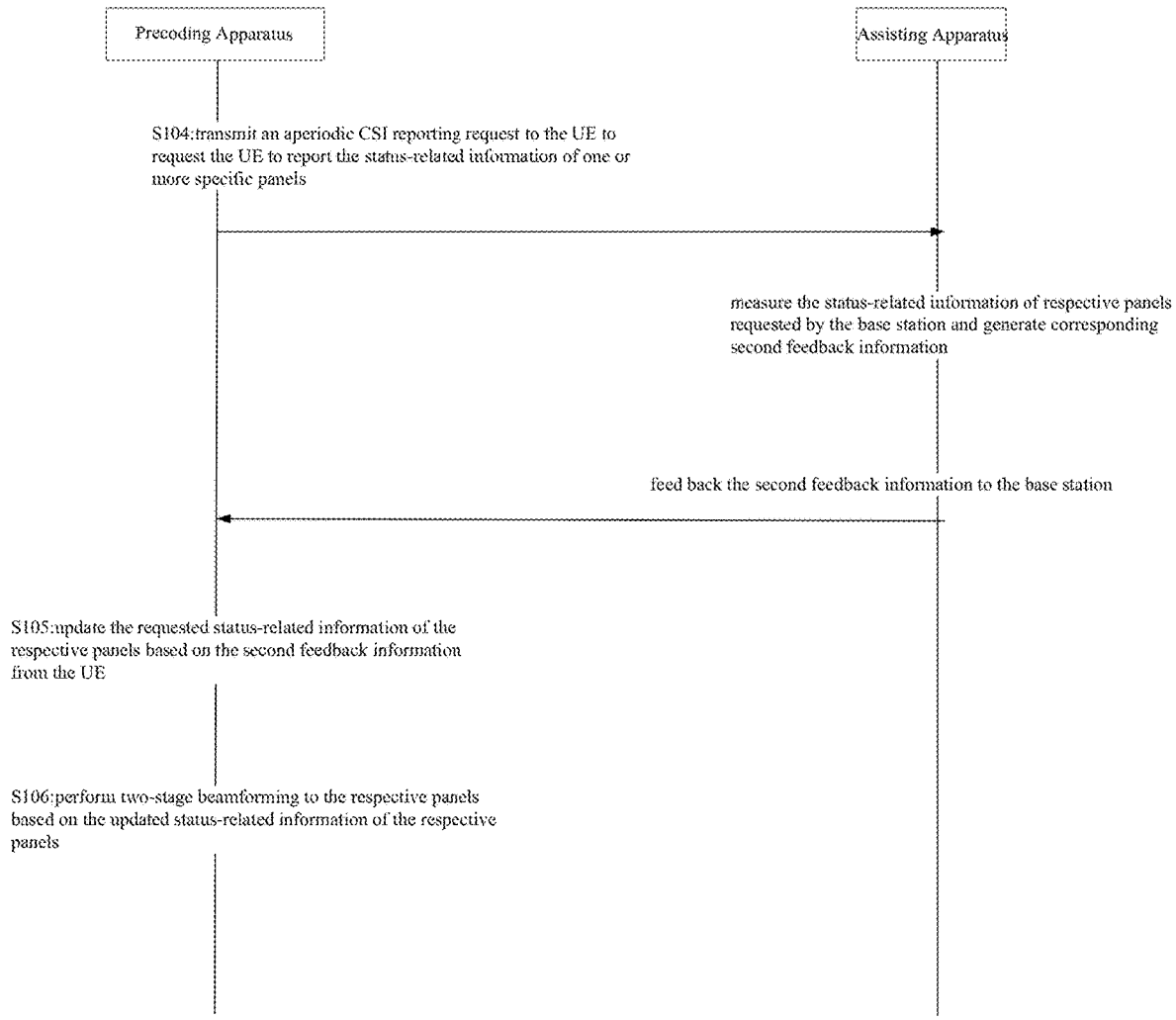
FIG. 7 is a flow diagram of a method for performing two-stage beamforming by updating the status-related information of a specific panel according to a preferred embodiment of the present disclosure.

FIG. 7 is a flow diagram of a method for two-stage beamforming by updating the status-related information of a specific panel according to a preferred embodiment of the present disclosure. The method comprises step S104, step S105, and step S106 carried out by the precoding apparatus.

Referring to FIG. 7, in step S104, the precoding apparatus transmits an aperiodic CSI reporting request to the UE to request the UE to report the status-related information of one or more specific panels.

For example, in the aperiodic CSI reporting request, indicator CRgI 1 and indicator CRgI 3 are applied to request the UE to feed back the status-related information of Panel_1 and Panel_3.

Upon receiving the request, the assisting apparatus in UE measures, in a manner similar to step S201~step S204 described above, the status-related information of the respective panels requested by the base station, generates corresponding second feedback information and feeds back the second feedback information to the base station, which will not be detailed here.

Particularly, the second feedback information refers to the feedback information with respect to the CSI reference signal from the base station.

Next, in step S105, the precoding apparatus updates the requested status-related information of the respective panels based on the second feedback information from the UE;

Next, in step S106, the precoding apparatus performs two-stage beamforming to the respective panels based on the updated status-related information of the respective panels.

Figure 8:
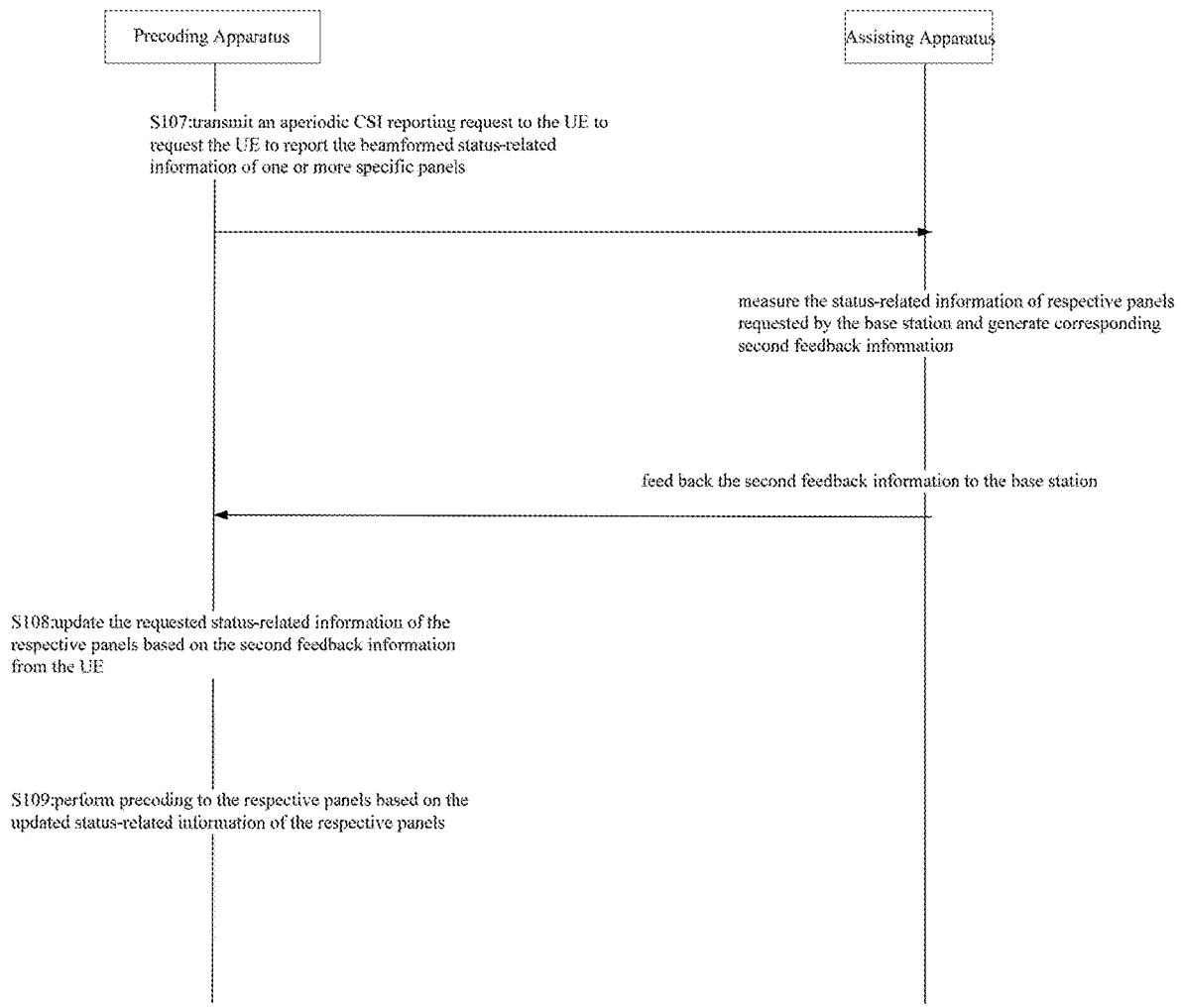
FIG. 8 is a flow diagram of a method for performing precoding by updating the status-related information of one or more specific panels according to a preferred embodiment of the present disclosure.

FIG. 8 is a flow diagram of a method for performing precoding by updating the status-related information of one or more specific panels according to a preferred embodiment of the present disclosure. The method comprises step S107, step S108, and step S109, which are carried out by the precoding apparatus.

Referring to FIG. 8, in step S107, the precoding apparatus transmits an aperiodic CSI reporting request to the UE to request the UE to report the beamformed status-related information of one or more specific panels.

Upon receiving the request, the assisting apparatus in the UE measures, in a manner similar to step S201~step S204 described above, the beamformed status-related information of respective panels requested by the base station, generates corresponding second feedback information, and feeds back the second feedback information to the base station, which will not be detailed here.

Next, in step S108, the precoding apparatus updates the requested status-related information of the respective panels based on the second feedback information from the UE.

In step S109, the precoding apparatus performs precoding to the respective panels based on the updated status-related information of the respective panels.

According to the above method provided by the present disclosure, status information of the respective panels measured by the UE is obtained through interaction between the base station and the UE; intra- and inter-panel interference can be effectively suppressed through the two-stage beamforming performed by the base station to the respective panels; moreover, the solution of the present disclosure implements per-panel two-stage beamforming, wherein the first-stage decoupling only requires the channels between some non-serving UEs and the current panel, which avoids the complex inter-panel calibration and reduces implementation complexity and CSI feedback overhead; moreover, the base station may transmit an aperiodic CSI reporting request to the UE so as to update the status-related information of a specific panel for execution of further signal processing, thereby enhancing system performance.

Figure 2:
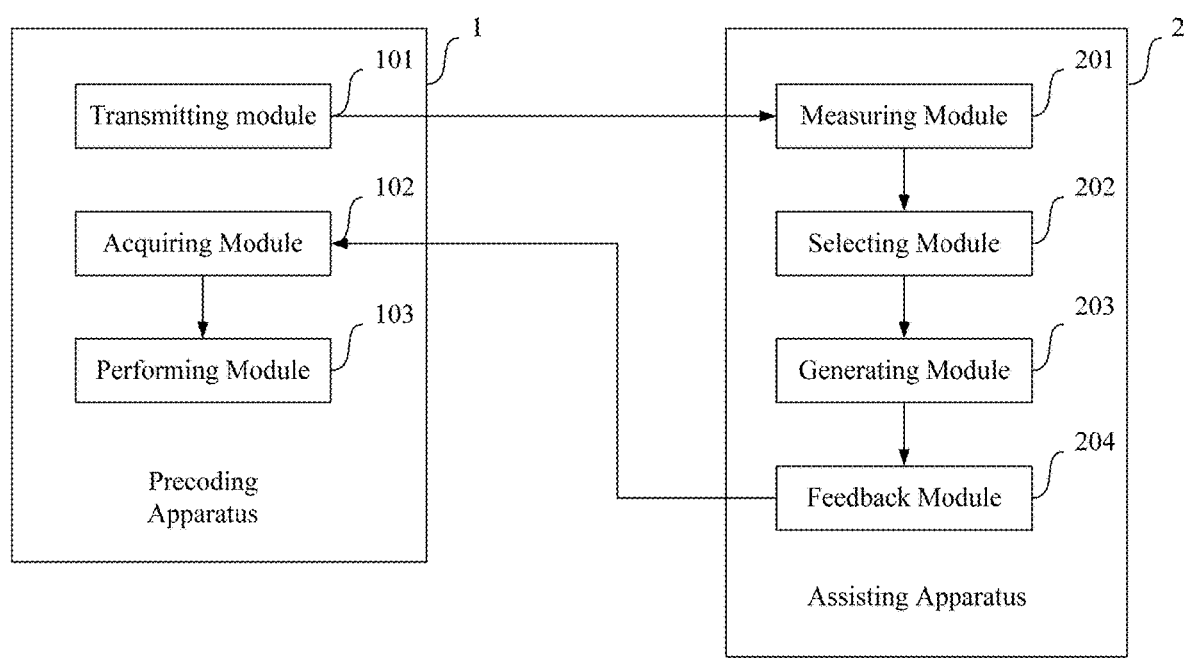
FIG. 2 is a structural schematic diagram of a precoding apparatus for performing precoding and an assisting apparatus for assisting in performing precoding according to the present disclosure.

FIG. 2 is a structural schematic diagram of a precoding apparatus for performing precoding and an assisting apparatus for assisting in performing precoding according to the present disclosure.

The precoding apparatus according to the present disclosure comprises a transmitting module 101, an acquiring module 102, and a performing module 103; and the assisting apparatus according to the present disclosure comprises a measuring module 201, a selecting module 202, a generating module 203, and a feedback module 204.

Preferably, the base station applies specific indicators to identify the respective panels, and the precoding apparatus comprises a configuration transmitting module (not shown), and the assisting apparatus comprises a configuration receiving module (not shown).

The configuration transmitting module transmits CSI configuration information to a UE so as to configure, in the UE, the indicators corresponding to respective panels.

Next, the configuration receiving module receives the CSI configuration information from the base station so as to configure, in the UE, the indicators corresponding to the respective panels.

Preferably, the base station uses specific indicators CRgIs to identify different panels and uses conventional CSI information to indicate status information of the panels. For example, for the scenario in FIG. 2, Panel_1 is indicated by CRgI 1, and Panel_2 is indicated by CRgI 2.

Preferably, the configuration transmitting module dynamically configures the port of each panel serving the UE by transmitting specific CSI configuration information to the UE.

For example, when there are an unequal number of UEs to be served by two panels of the base station, the configuration transmitting module assigns an unequal number of ports to each of the two panels by transmitting specific CSI configuration information to the UE.

Preferably, the configuration transmitting module performs the configuration process in higher layer signaling such as RRC or MAC signaling.

Hereinafter, the illustration will be made with reference to FIG. 2, wherein the transmitting module 101 transmits a CSI reference signal to a UE to request the UE to report status-related information of the respective panels;

Next, upon receiving the CSI reference signal transmitted from a base station, the measuring module measures status-related information of one or more panels.

Particularly, the status-related information includes various kinds of channel status-related information.

Preferably, the status-related information refers to CSI information, including PMI (precoding matrix indicator), RI (rank indication), and CQI (channel quality indicator), etc.

The selecting module selects, by performing a channel status estimation operation, one panel as the serving panel from the respective panels whose status-related information has been measured;

Specifically, the selecting module selects the panel with currently best channel status as the serving panel by performing a channel status estimation operation.

Next, the generating module 203 generates corresponding first feedback information.

Particularly, the first feedback information includes the indicator of the selected panel and the status-related information of the respective panels.

Particularly, the first feedback information refers the feedback information with respect to the CSI reference signal from the base station.

Preferably, the assisting apparatus feeds back, in the first feedback information, the status-related information corresponding to multiple panels.

Preferably, the first feedback information includes the indicator of the serving panel selected by each UE and the status-related information of other potential panels.

Next, the feedback module 204 feeds back the first feedback information to the base station.

Preferably, the first feedback information can be multiplexed in time or frequency, depending on different PUCCH formats.

Next, the acquiring module 102 acquires, based on the first feedback information from the UE, the status-related information of the respective panels measured by the UE and a serving panel selected by the UE;

Next, the performing module 103 performs, based on the status-related information of the respective panels and the serving panel selected by the UE, two-stage beamforming separately to the respective panels, so as to first perform decoupling to suppress inter-panel interference and then perform per-panel precoding Specifically, the performing module 103 comprises a decoupling submodule (not shown) and a precoding submodule (not shown).

The decoupling submodule calculates, based on the channels from the UE to the respective panels, the decoupling matrices and beamforming matrices corresponding to the respective panels.

Next, the precoding submodule performs precoding to the respective panels.

Preferably, the decoupling submodule calculates the decoupling matrices and beamforming matrices corresponding to the respective panels using the SLNR algorithm.

According to a preferred embodiment of the present disclosure, the base station transmits an aperiodic CSI reporting request to the UE to update the status-related information of a specific panel for further performance of signal processing, thereby enhancing system performance.

Particularly, if the base station needs to update the state-related information of one or more specific panels to perform two-stage beamforming, the precoding apparatus comprises a first transmitting module (not shown), a first updating module (not shown), and a first processing module (not shown).

The first transmitting module transmits an aperiodic CSI reporting request to the UE to request the UE to report status-related information of the one or more specific panels;

For example, in the aperiodic CSI reporting request, indicator CRgI 1 and indicator CRgI 3 are applied to request the UE to feed back the status-related information of Panel_1 and Panel_3.

Upon receiving the request, the assisting apparatus in the UE measures, in a manner similar to the operations performed by the receiving module 201~feedback module 204 described above, the status-related information of the respective panels requested by the base station, generates corresponding second feedback information, and feeds back the second feedback information to the base station, which will not be detailed here.

Particularly, the second feedback information refers to the feedback information with respect to the CSI reference signal from the base station.

Next, the first updating module updates the requested status-related information of the respective panels based on the second feedback information from the UE;

Next, the first processing module performs two-stage beamforming to the respective panels based on the updated status-related information of the respective panels.

Preferably, if the base station requires the state-related information of one or more specific panels to perform precoding, the precoding apparatus comprises a second transmitting module (not shown), a second updating module (not shown), and a second processing module (not shown).

The second transmitting module transmits an aperiodic CSI reporting request to the UE to request the UE to report beamformed status-related information of the specific one or more panels.

Upon receiving the request, the assisting apparatus in UE measures, in a manner similar to step S201~step S204 described above, the beamformed status-related information of the respective panels as requested by the base station, generates corresponding second feedback information, and feeds back the second feedback information to the base station, which will not be detailed here.

Next, the second updating module updates, based on the second feedback information from the UE, the requested status-related information of the respective panels.

Next, the second processing module performs precoding to the respective panels based on the updated status-related information of the respective panels.

According to the solutions of the present disclosure, the status information of the respective panels measured by the UE is obtained through interaction between the base station and the UE; intra- and inter-panel interference can be effectively suppressed through the two-stage beamforming performed by the base station to the respective panels; moreover, the solution of the present disclosure implements per-panel two-stage beamforming, wherein the first-stage decoupling only requires the channels between some non-serving UEs and the current panel, which eliminates the complex inter-panel calibration and reduces implementation complexity and CSI feedback overhead; moreover, the base station may transmit an aperiodic CSI reporting request to the UE so as to update the status-related information of a specific panel for execution of further signal processing, thereby enhancing system performance.

Hereinafter, experimental simulation results of the present disclosure will be illustrated with reference to FIG. 9 and FIG. 10.

The MU MIMO system is simulated using Monte-Carlo simulations, wherein Tomlinson-Harashima Precoding (THP) is applied for per panel precoding. The simulation setup is depicted in Table 1, where it is assumed that $N_T^{(g)}=16$ effective chains for each panel.

| Simulation Parameters (Single-cell) | |
|---|---|
| Channel model | Clustered channel model |
| Number of clusters | 10 |
| Number of rays per cluster | 8 |
| Channel gain | Complex Normal distribution |
| Azimuth & Elevation angles | Laplacian distribution |
| Carrier frequency | 28 GHz |
| Array @ BS | (M, N, P, Mg, Ng) = (16, 8, 1, 2, 1) |
|  | (dv, dH) = (0.5, 0.5)λ |
| Array @ UE | 2 (ULA) |
| Throughput mapping method | SINR to throughput using Shannon Capacity with infinite bits per channel use |

Figure 9:
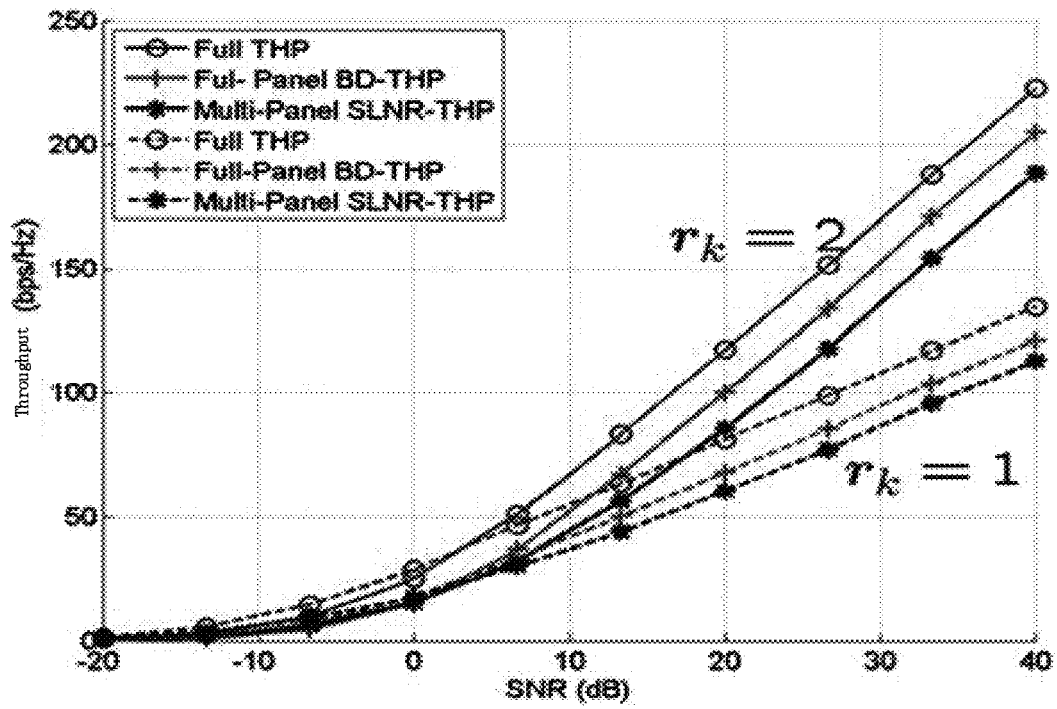
FIG. 9 is a schematic diagram of exemplary simulation results according to the present disclosure.
Figure 10:
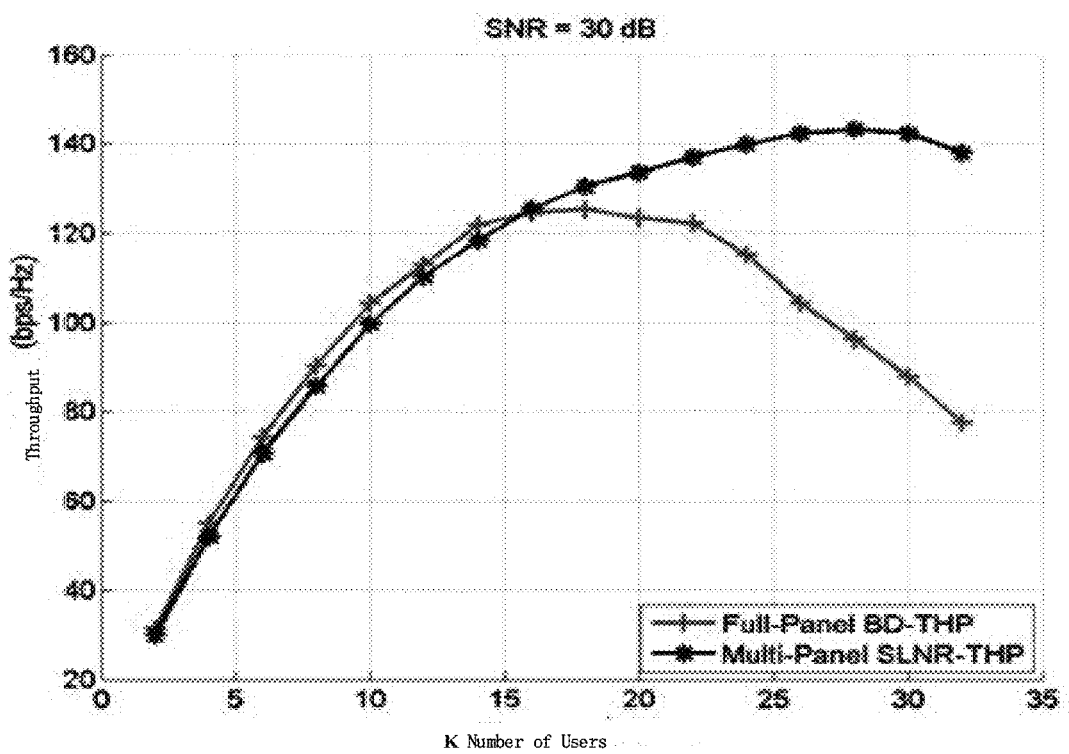
FIG. 10 is a schematic diagram of exemplary simulation results according to the present disclosure.

With reference to FIGS. 9 and 10, "Full THP" corresponds to the fully digital non-linear precoding scheme using the whole array. The "Full-Panel BD-THP" is the full-panel based scheme applying BD as decoupling and THP as per-panel precoding. "Multi-Panel SLNR-THP" indicates that the scheme of the present disclosure does not require any joint transmission at all.

FIG. 9 shows the throughput performance versus SNR for K=8 and the number of data streams $R_K$=1, 2. It can be observed that "Full THP" obviously achieves the best performance and the "Full-Panel BD-THP" scheme shows a good performance. Even though the scheme "Multi-Panel SLNR-THP" according to the present disclosure relies on the decoupled/decentralized processing for first-stage beamforming, i.e., only one out of the two panels is applied, it has only a small performance degradation as compared to "Full-Panel BD-THP".

With reference to FIG. 10, the number of data streams per user is fixed as $r_k$=1 and the throughput performance for various schemes versus the number of UEs K at SNR=30 dB is evaluated. The performance of the "Full-Panel BD-THP" scheme is advantages over that of the "Multi-Panel SLNR-THP" scheme as a higher multiplexing gain can be extracted when K<12 but degrades for K>16. The main reason is that crowded users lead to highly correlated channels and the BD based decoupling method does not work well. The "Multi-Panel SLNR-THP" scheme based on the present disclosure has a fast-increased performance until K=16 and then the increase stays slow for larger K, not like the "Full-Panel BD-THP" scheme whose performance degrades at the start.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limiting; the scope of the present disclosure is limited by the appended claims, instead of the above depiction. Thus, all variations intended to fall into the meaning and scope of equivalent elements of the claims should be covered within the present disclosure. No reference signs in the claims should be treated as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

We claim:

1. A method for performing precoding in a base station, wherein the antenna array of the base station is divided into a plurality of panels, each of the plurality of panels corresponding to a plurality of ports to serve multiple users, the method comprising:
    transmitting, using the base station, a channel status information CSI reference signal to a UE to request the UE to report status-related information of respective panels of the plurality of panels;
    acquiring, using the base station, based on first feedback information from the UE, the status-related information of the respective panels whose status-related information has been measured by the UE and a serving panel among the plurality of panels selected by the UE; and
    performing, using the base station, based on the status-related information of the respective panels and the serving panel selected by the UE, two-stage beamforming separately to the respective panels, so as to first perform decoupling to suppress inter-panel interference and then perform per-panel precoding.

2. The method according to claim 1, wherein the performing includes:
    calculating, based on channels from the UE to the respective panels, decoupling matrices and beamforming matrices corresponding to the respective panels, and performing precoding to the respective panels.

3. The method according to claim 1, wherein the base station applies specific indicators to identify the respective panels, and the method further comprises steps of:
    transmitting CSI configuration information to the UE so as to configure, in the UE, the indicators corresponding to the respective panels.

4. The method according to claim 1, wherein the method further comprises:
    in response to the base station needing to update the status-related information of one or more specific panels to perform two-stage beamforming,
        transmitting an aperiodic CSI reporting request to the UE so as to request the UE to report the status-related information of the one or more specific panels,
        updating the requested status-related information of the respective panels based on second feedback information from the UE, and
        performing two-stage beamforming to the respective panels based on the updated status-related information of the respective panels.

5. The method according to claim 1, wherein the method further comprises:
    in response to the base station requiring the status-related information of the one or more specific panels to perform precoding
        transmitting an aperiodic CSI reporting request to the UE so as to request the UE to report beamformed status-related information of the one or more specific panels,
        updating the requested status-related information of the respective panels based on second feedback information from the UE, and
        performing precoding to the respective panels based on the updated status-related information of the respective panels.

6. A method for assisting in performing precoding in a UE, comprising:
    measuring status-related information of one or more panels upon receiving a CSI reference signal transmitted from a base station;
    selecting, by performing a channel status estimation operation, one panel as a serving panel from respective panels whose status-related information has been measured;
    generating corresponding first feedback information, wherein the first feedback information includes the indicator of the selected panel and the status-related information of the respective panels;
    feeding back the first feedback information to the base station;
    receiving an aperiodic CSI reporting request requesting reporting the status-related information of the respective panels; and
    sending, to the base station, second feedback information reporting the status related information of the respective panels in response to the received aperiodic CSI reporting request.

7. The method according to claim 6, wherein the base station applies specific indicators to identify the respective panels, the method comprising steps of:
    receiving CSI configuration information from the base station so as to configure, in the UE, the indicators corresponding to the respective panels.

8. A precoding apparatus for performing precoding in a base station, wherein an antenna array of the base station is divided into a plurality of panels, each panel corresponding to a plurality of ports to serve multiple users, the precoding apparatus comprising:
    at least one processor; and
    at least one memory comprising computer program code, the at least one memory and computer program code configured, with the at least one processor, to cause the precoding apparatus at least to
        transmit a channel status information CSI reference signal to a UE to request the UE to report status-related information of respective panels,
        acquire, based on first feedback information from the UE, the status-related information of the respective panels measured by the UE and a serving panel selected by the UE, and
        perform, based on the status-related information of the respective panels and the serving panel selected by the UE, two-stage beamforming separately to the respective panels, so as to first perform decoupling to suppress inter-panel interference and then perform per-panel precoding.

9. The precoding apparatus according to claim 8, wherein the at least one memory and computer program code are configured, with the at least one processor, to cause the precoding apparatus at least to
    calculate, based on channels from the UE to the respective panels, decoupling matrices and beamforming matrices corresponding to the respective panels, and
    perform precoding to the respective panels.

10. The precoding apparatus according to claim 8, wherein
    the base station applies specific indicators to identify the respective panels, and the at least one memory and computer program code are configured, with the at least one processor, to cause the precoding apparatus at least to transmit CSI configuration information to the UE so as to configure, in the UE, the indicators corresponding to the respective panels.

11. The precoding apparatus according to claim 8, wherein the at least one memory and computer program code are configured, with the at least one processor, to cause the precoding apparatus at least to in response to the base station needing to update the status-related information of one or more specific panels to perform two-stage beamforming transmit an aperiodic CSI reporting request to the UE to request the UE to report the status-related information of the one or more specific panels;

update the requested status-related information of the respective panels based on second feedback information from the UE; and perform two-stage beamforming to the respective panels based on the updated status-related information of the respective panels.

12. The precoding apparatus according to claim 8, wherein the at least one memory and computer program code configured, with the at least one processor, to cause the precoding apparatus at least to in response to the base station requiring the status-related information of one or more specific panels to perform precoding transmit an aperiodic CSI reporting request to the UE to request the UE to report beamformed status-related information of the specific one or more panels, update the requested status-related information of the respective panels based on the second feedback information from the UE, and perform precoding to the respective panels based on the updated status-related information of the respective panels.

13. An assisting apparatus for assisting in performing precoding in a UE, comprising:

at least one processor; and at least one memory comprising computer program code, the at least one memory and computer program code configured, with the at least one processor, to cause the assisting apparatus at least to measure status-related information of one or more panels upon receiving a CSI reference signal transmitted from a base station, select, by performing a channel status estimation operation, one panel as a serving panel from the respective panels whose status-related information has been measured, generate corresponding first feedback information, wherein the first feedback information includes the indicator of the selected panel and the status-related information of the respective panels, feedback the first feedback information to the base station;

receive an aperiodic CSI reporting request requesting reporting the status-related information of the respective panels; and send second feedback information reporting the status related information of the respective panels in response to the received aperiodic CSI reporting request.

14. The assisting apparatus according to claim 13, wherein the base station applies specific indicators to identify the respective panels, and the at least one memory and computer program code configured, with the at least one processor, to cause the assisting apparatus at least to:

receive CSI configuration information from the base station so as to configure, in the UE, the indicators corresponding to the respective panels.

\* \* \* \* \*